Nov. 17, 1964     M. R. HENSON     3,156,962
SNAP FASTENER
Filed Dec. 10, 1962
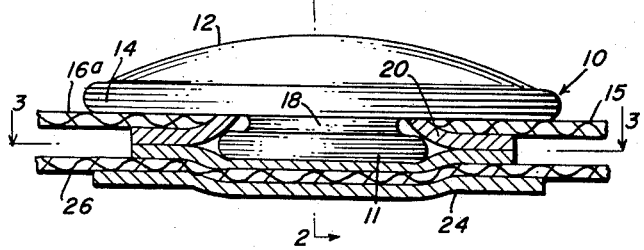
FIG. 1
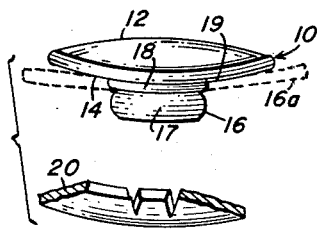
FIG. 4
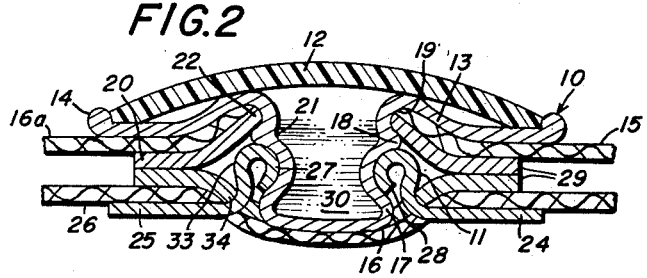
FIG. 2
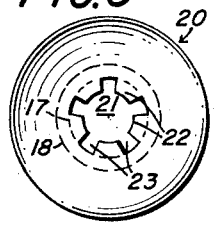
FIG. 5
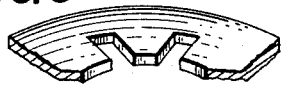
FIG. 8
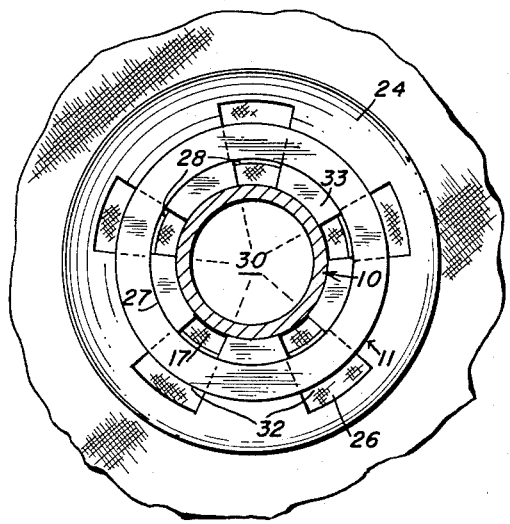
FIG. 3
FIG. 6
FIG. 7
INVENTOR
Mable Ruth Henson

3,156,962
SNAP FASTENER
Mable R. Henson, Kingston, Ark.
Filed Dec. 10, 1962, Ser. No. 243,307
1 Claim. (Cl. 24—217)

This invention pertains to separable snap fasteners of the general type comprising complemental stud and socket members commonly used as fastening means for garments, gloves, and like purposes.

One of the objects of this invention is to provide a snap fastener which may be affixed to a garment or the like without the use of auxiliary attaching means such as thread, special clips, crimping or riveting.

Another object of this invention is to provide a snap fastener which may be easily applied to and removed from a garment as desired, for ease of laundering garments.

Further features and advantages of this invention will appear from a detailed description of the drawing in which:

FIG. 1 is an enlarged side elevation of a snap fastener incorporating the features of this invention.

FIG. 2 is an enlarged sectional view on the line 2—2 of FIG. 1.

FIG. 3 is an enlarged sectional plan view on the line 3—3 of FIG. 1.

FIG. 4 is an exploded elevational view of the stud member and the depressed spring washer in relation of assembly to a garment.

FIG. 5 is a plan view of the depressed spring washer used in securing the stud member to a garment. The washer has a slightly depressed center portion for stronger securement of cloth to the stud member.

FIG. 6 is a plan view of the spring washer used in securing the socket member to a garment.

FIG. 7 is a sectional view of the socket member.

FIG. 8 is a sectional view on the line 8—8 of FIG. 6.

As an example of one embodiment of this invention, there is shown a snap fastener comprising a stud member 10 and a socket member 11. The stud member 10 preferably has the usual decorative insert 12 in the flange portion 13 whose rear radial face 14 abuts against the outer face 15 of the garment cloth 16a. A spherical end 16 is formed on the outer end of the stud portion 17. A clamping bead 18 is formed integral with the flange portion 13 and the stud portion 17 and located intermediate thereof to form an annular snap groove 19 adjacent the rear radial face 14 of the flange portion 13. A centrally depressed snap spring washer 20 has a bore 21 formed by a series of radially inwardly extending prongs 22 circumferentially spaced by cavities 23. The spring washer 20 is adapted to be pressed over the clamping bead 18 so that its prongs snap into position in the annular groove 19 to tightly pinch the cloth 16a between the spring washer 20 and the rear radial face 14 of the flange portion 13 to securely fasten the stud member 10 to the cloth.

Similarly, the socket member 11 has a flange portion 24 having a radial face 25 engaging the garment cloth 26 and a socket 27 having suitable notches 28 adapted to snap over the spherical end 16 of the stud portion 17 of the stud member 10. A clamping bead 33 is formed integral with the flange portion 25 and the socket portion 27 and located therebetween to form an annular snap groove 34 adjacent the rear radial face 25 of the flange portion 24. A centrally depressed snap spring washer 29 has a bore 30 formed by a series of radially inwardly extending prongs 31 circumferentially spaced by cavities 32. The spring washer 29 is adapted to be pressed over the clamping bead 33 so that its prongs snap into position in the annular groove 34 to tightly pinch the cloth 26 between the spring washer 29 and the radial face 25 of the flange portion 24 of the socket member 11 to securely fasten the socket member to the cloth.

The spring washers can be readily removed from associated fastener members 10 and 11 by applying a suitable prying instrument between a washer and an associated abutment surface radial face 25 (or 14) of an associated fastener member and prying the washer away from the cloth associated therewith.

Having thus fully set forth and described this invention what is claimed and desired to be obtained by the United States Letters Patent is:

A snap fastener comprising first and second members adapted to be secured to associated portions of fabric by snap spring washers and adapted to be releasably interconnected by a stud extending from one member and a resilient socket formed in the other member, said stud having an enlarged head and an intermediate enlarged clamping bead, said socket having an inwardly extending claw like gripping portion of generally arcuate configuration adapted to be received between said enlarged portions of said stud and providing an enlarged clamping bead for securing an associated central portion of a washer thereto, the undersurface of said stud containing member being recessed adjacent said stud bead for securing an associated central portion of a washer therebetween, said central portions of said washers being concave and the stud bead being substantially even with the outside perimeter of the stud containing member so that the washers abut each other when the stud and socket are snapped together to more securely grip fabric associated therewith.

References Cited by the Examiner
UNITED STATES PATENTS

| | | | |
|---|---|---|---|
| 391,200 | 10/88 | Shipman | 24—217 |
| 1,201,528 | 10/16 | Taylor | 24—213 |
| 1,265,719 | 5/18 | Anderson | 24—217 |
| 1,904,122 | 4/33 | Chapman | 24—217 |
| 2,440,685 | 5/48 | Huelster | 24—217 |

FOREIGN PATENTS

| | | |
|---|---|---|
| 117,961 | 2/01 | Germany. |
| 356,785 | 7/22 | Germany. |
| 334,780 | 1/36 | Italy. |
| 704,837 | 2/31 | France. |

DONLEY J. STOCKING, *Primary Examiner.*